March 4, 1941.  J. E. HOFFMAN  2,233,665
DISK HARROW
Filed April 5, 1939
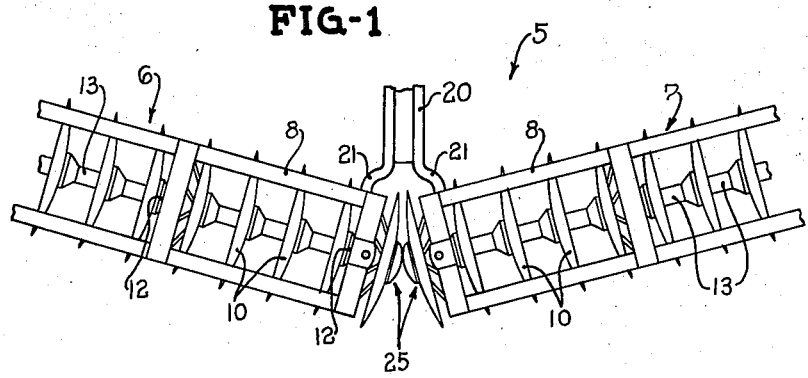
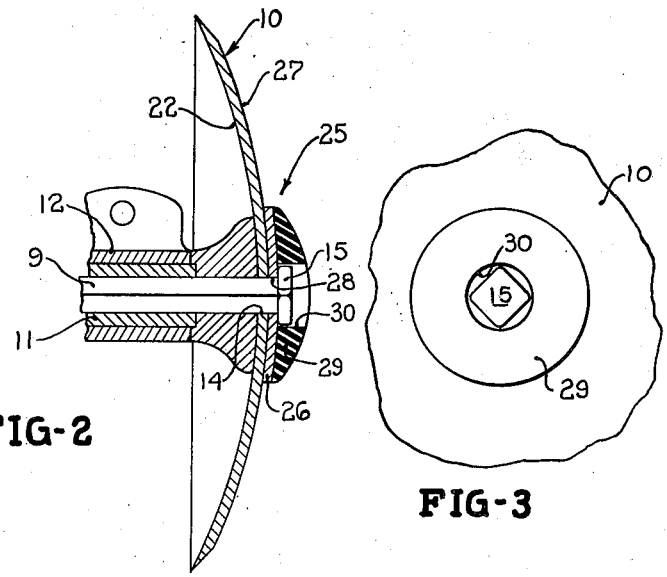
INVENTOR:
JOHN E. HOFFMAN
ATTORNEYS.

Patented Mar. 4, 1941

2,233,665

UNITED STATES PATENT OFFICE 2,233,665

DISK HARROW

John E. Hoffman, Moline, Ill., assignor to Deere & Company, Moline, Ill., a corporation of Illinois Application April 5, 1939, Serial No. 266,097

3 Claims. (Cl. 55—81)

The present invention relates to disk harrows of the class comprising a pair of angularly disposed disk gangs adapted to throw soil outwardly from the center of the harrow with a resulting inward thrust of the gangs toward each other. More specifically, my invention relates to the provision for transmitting the thrust between the two gangs, and has for its principal object the provision of an improved and more durable thrust transmitting means.

A harrow of this type is shown in detail in Patent No. 1,941,504 issued to C. H. White on January 2, 1934, to which reference is made for a complete description of such an implement. It is common practice to provide the two disk gangs with spherical steel end caps which roll in contact with each other during ground working operation and transmit the opposing end thrusts of the gangs therebetween, regardless of the operating angle between the gangs. It is a specific object of this invention to provide thrust caps which are more resistant to wear and less subject to breakage due to impact between the caps, than any known at present in the art.

In the accomplishment of these objects, I have provided thrust caps made of wear resisting rubber which cushion any impacts between the gangs. One embodiment of my invention will now be described with reference to the appended drawing, in which Figure 1 is a plan view of the central portion of a disk harrow embodying my invention;

Figure 2 is a sectional view of one of the inner end discs and a thrust cap embodying this invention; and Figure 3 is a fragmentary end view of one of the disk gangs showing the thrust cap.

Referring now to the drawing, the disk harrow 5 comprises a pair of disk gangs 6, 7, which is shown more or less diagrammatically but is of the type shown in the above mentioned White patent, although my invention is not limited to this particular implement. Each gang comprises a gang frame 8, a gang bolt 9, and a plurality of concavo-convex ground working disks 10 supported on the bolt 9 in axially spaced relation. The bolt 9 is of square cross section and is supported in bearing sleeves 11, which are journaled in bearings 12, carried on the frame 8 in the conventional manner. The disks are spaced apart by spools 13. The disks 10, bearing sleeves 11, and spacing spools 13 are provided with square apertures 14 adapted to receive the square gang bolt 9 and to prevent rotation of the disks, bearing sleeves, and spools relative to the bolt. The bolt is provided with a head 15 at one end and a nut (not shown) at the other end for clamping the several parts together for rotation as a unit in the bearings 12.

The harrow is propelled by a draft tongue 20 having a pair of rearwardly diverging arms 21, which are coupled to the inner bearing castings 12. Outer draft members (not shown), connected to the outer portions of the gangs in the conventional manner, serve to hold the gangs in rearwardly converging angular relation, as indicated in Figure 1. The disks are positioned with the concave surfaces 22 facing outwardly, causing the soil to be thrown outwardly in both directions from the center of the harrow, as is well known. This results in inwardly directed end thrusts exerted by the gangs, which are transmitted between the gangs through a pair of thrust caps 25. The end thrusts of the two gangs thus oppose each other and substantial equilibrium is obtained.

Each end cap 25 comprises a concavo-convex metal plate 26, the concave side of which fits the curvature of the convex side 27 of the end disk, and the plate is provided with a square aperture 28, which slidably receives the square gang bolt 9. Obviously, if a gang bolt, having a cross section other than square, is used, the apertures in the disks, spools, and end caps should be made to fit.

Fixed to the convex surface of the plate 26 is a rounded pad 29 of resilient, wear resisting material, preferably rubber. Preferably, the rubber pad is vulcanized to the plate in a known manner although other methods of fixing the pad thereto may be apparent to those skilled in the art. The pad 29 is in the form of a spherical segment, whereby the two contacting pads of the two opposed gangs 6, 7, can roll in contact with each other as the implement advances, regardless of the degree of angularity of the gangs. A central recess or aperture 30 is provided in the pad in register with the aperture 28 in the plate, but is large enough to receive the head 15 of the gang bolt 9. The pad being thicker than the head 15, it serves to protect the latter against wear and shocks.

In operation, the pads transmit the opposing thrust forces between the gangs, the spherical surfaces rolling on each other. The pads are soft enough so that, in thus transmitting the thrust forces from one gang to the other, they yield until the areas in contact are sufficient to carry the thrust load, and due to this yielding action, when dirt and small stones are caught between the rubber caps, the dirt, small stones and the like merely pass through between the caps without causing the excessive wear and vibration which occur when metal bumpers are used. In this connection, it will be remembered that the bumpers of disk harrows and the like run very close to the ground surface and that the rolling of the two innermost disks lifts up grit, dirt and the like which falls in a more or less continuous shower down onto the bumpers. Since there is not as much grinding action between the caps as with metal bumpers, since the dirt, small stones and the like are momentarily surrounded by the yielding rubber and merely pass through between the caps and drop down therefrom when the stone-carrying portions of the caps pass out of the pressure zone, for this reason, the rubber caps are more resistant to wear than are solid metal caps of the conventional type. Wear is further reduced by the tendency of the rubber pads to flex, rather than rub together, when the gangs move slightly relative to each other.

What I claim as my invention is:

1. In a harrow gang of the class described, comprising a gang bolt of square cross section and a plurality of concavo-convex ground working disks supported thereon in axially spaced relation, a thrust transmitting cap comprising a curved metal plate adapted to fit the curvature of the convex surface of the end disk and having a square opening for receiving said gang bolt and preventing rotation of said plate relative thereto, and a rounded pad of wear resisting rubber fixed to the outer surface of said plate and having a recess therein larger than said square opening and adapted to receive the head of said gang bolt.

2. A thrust cap for a harrow gang, said cap comprising a concavo-convex metal plate, a non-circular opening in the plate to receive a bolt and for preventing rotation of said cap relative thereto, and a pad of wear resisting resilient material fixed to the convex side of said plate and having an opening in register with said opening in the plate.

3. A thrust cap for a harrow gang, said cap comprising a metal plate having a gang bolt receiving opening therein, and a pad of wear resisting resilient material fixed to one side of said plate and having an opening for receiving the head of the gang bolt and generally registering with said opening in the plate, the opening in said resilient pad providing for the disposition of said bolt head in contact with said metal plate.

JOHN E. HOFFMAN.